A. DAVIS & A. C. COLLINS.
ACETYLENE GENERATOR.
APPLICATION FILED OCT. 28, 1912.
1,094,365.
Patented Apr. 21, 1914.
2 SHEETS—SHEET 2.
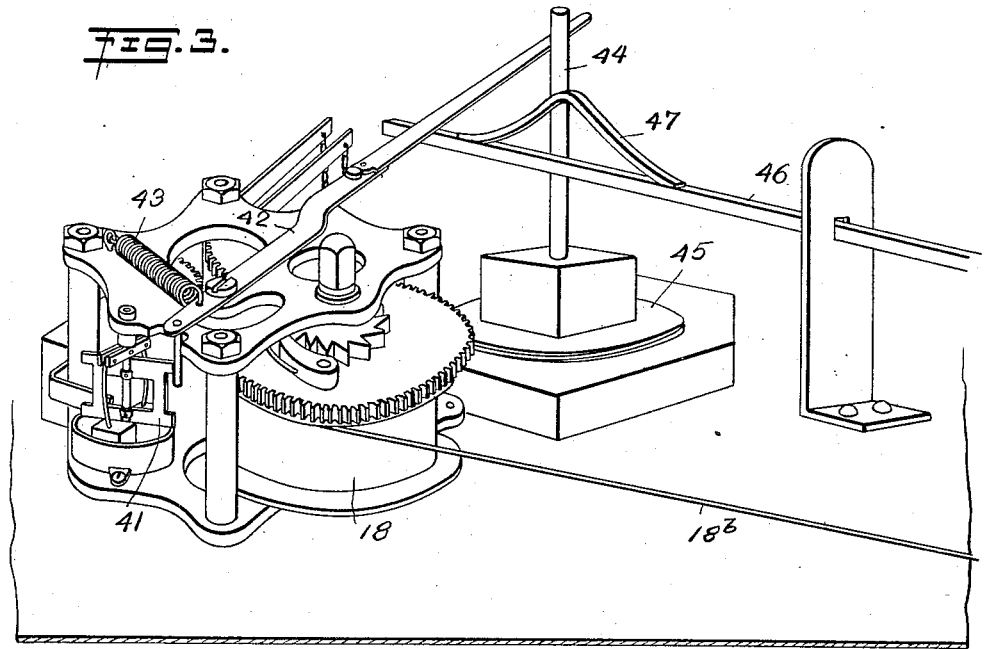
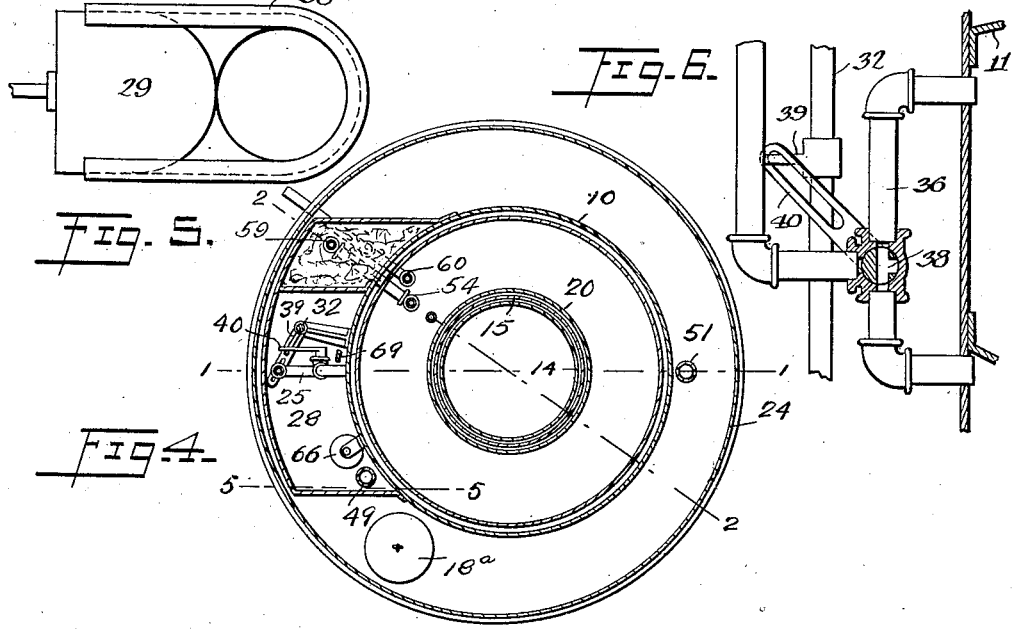
WITNESSES
INVENTORS
BY
ATTORNEY

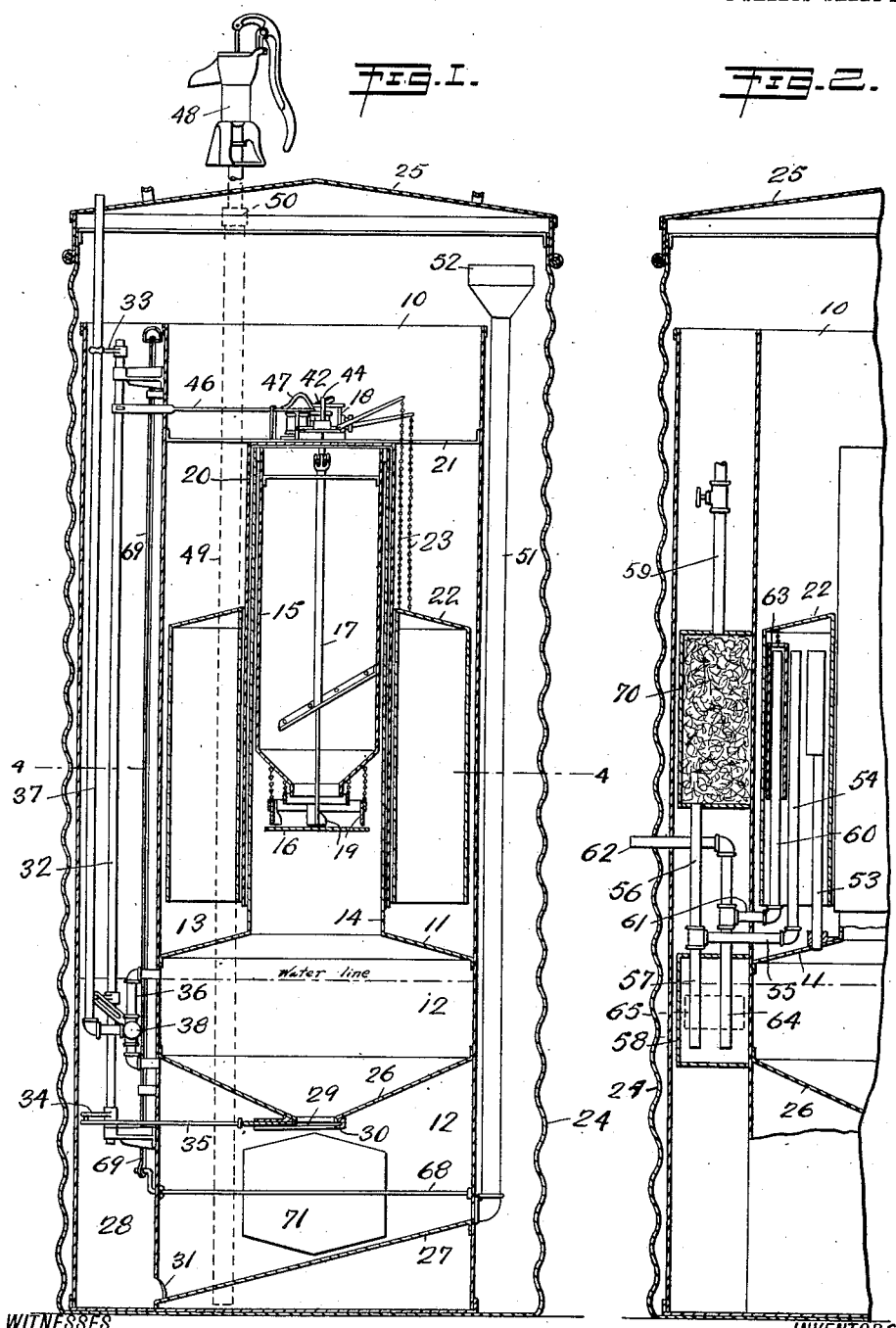

UNITED STATES PATENT OFFICE.

AUGUSTINE DAVIS, OF BROOKLYN, NEW YORK, AND ALVA C. COLLINS, OF ELKHART, INDIANA, ASSIGNORS TO DAVIS ACETYLENE COMPANY, OF ELKHART, INDIANA, A CORPORATION OF SOUTH DAKOTA.

ACETYLENE-GENERATOR.

1,094,365.  Specification of Letters Patent.  Patented Apr. 21, 1914.

Application filed October 28, 1912. Serial No. 728,058.

*To all whom it may concern:*

Be it known that we, AUGUSTINE DAVIS and ALVA C. COLLINS, citizens of the United States, residing, respectively, in the borough of Brooklyn, county of Kings, and State of New York, and Elkhart, in the county of Elkhart and State of Indiana, have invented certain new and useful Improvements in Acetylene-Generators, of which the following is a specification.

This invention relates to acetylene generators of the type in which the carbid is fed by suitable mechanism so as to fall into a body of water contained in the generating chamber or lower part of the tank. Such generators are charged with a predetermined amount of carbid, and the generating chamber is designed to hold an appropriate quantity of water, the customary requirement being a gallon of water for each pound of carbid. When the charge is exhausted it is necessary to put a new charge of carbid in the hopper and to remove the residuum from the generating chamber and refill it with water. In underground generators the removal of the residuum has been attended by difficulty and some risk, since the admission of air to the interior of the generator might produce an explosive mixture which is liable to become ignited during the cleaning operation. In any event an air mixture is undesirable.

The object of this invention is to enable the residuum of underground generators to be removed in a manner at once safe, convenient and thorough, avoiding the formation of an air mixture. To this end means are provided for sealing off the upper part of the generating chamber from the lower portion, which latter contains the residuum and a large part of the body of water, when the charge of carbid is exhausted and the residuum is to be removed, together with means for removing the contents of the lower portion of the generating chamber upward above ground while the upper portion is thus cut off. In this way the operation of cleaning out the generating chamber may be performed with perfect safety, and by the employment of a pump the removal may be effected conveniently and quickly. Means are also provided for flushing and refilling the lower portion of the generating chamber with fresh water while the two portions are shut off from each other. The two portions of the generating chamber are normally in free communication with each other, that is to say, during feeding of the carbid to the water therein and the evolution of the gas, and their combined capacity is not greater than is necessary to hold the volume of water prescribed for the charge of carbid which the generator is designed to receive. As a matter of fact their combined capacity is smaller, there being an outside tube or chamber in communication with the lower portion of the generating chamber to enable the removal of the residuum upward above ground, which holds a part of the body of water. From this tube are pumped the residuum and liquid contained therein and in the lower portion of the generating chamber.

Various other objects and features of the invention will become apparent as the specification proceeds.

In the accompanying drawings illustrating the invention in its preferred embodiment: Figure 1 is a vertical longitudinal section on the line 1—1 of Fig. 4; Fig. 2 is a partial vertical section taken on the line 2—2 of Fig. 4; Fig. 3 is a perspective view of parts at the top of the generator; Fig. 4 is a horizontal section on the line 4—4 of Fig. 1; and Figs. 5 and 6 are detail views.

The generator comprises an upright cylindrical tank 10 having a cross partition 11 nearer its bottom than its top to separate the generating chamber 12 below from the bell chamber 13 above. This partition has a central opening and slopes upward from its sides to this opening. A central vertical tube 14 is fixed to the partition 11 at the lower end of the tube and at the margin of the opening, and extends upward toward the top. In the upper and major portion of this tube is held a carbid hopper 15, which has a predetermined capacity, say for fifty or a hundred pounds of carbid. This hopper and the feed mechanism are of a known character and it is sufficient to say that a horizontal disk 16 is located at a distance below the open mouth of the hopper and is rotated by a vertical shaft 17, which extends upward through the hopper and is separably connected with a weight motor 18 operated by the weight $18^a$ and cord $18^b$. The carbid rests on the disk and as the latter rotates the lumps near the periphery are pushed off by engagement with stationary but flexibly supported deflectors 19. The tube 14 is closed by a tubular cover 20, the lower portion of which dips below the water line in the bell chamber so as to afford a water seal against the escape of the gas. The cover 20 and the motor 18 may be supported by a cross-bar 21, bolted or otherwise detachably secured at its ends to the inner sides of the tank. A bell 22 operates to stop and start the motor by means of chains 23 in the manner known in the art and disclosed more particularly in Patent No. 719091, dated January 27, 1903, the construction being such that the motor is automatically stopped when the bell rises above a predetermined height, thus preventing excessive generation of the gas, and also when the bell falls to the bottom, which occurs if there is a leak in the generator or system.

The generator is installed underground in a pit, which is preferably lined by an outer casing 24. This casing is larger than the generator so that an air space is afforded around the latter. The top of the casing is closed by a removable cover 25.

The generating chamber 12 is partially divided by a partition 26, which is located nearer to the partition 11 than it is to the bottom 27. This partition 26 partially divides the generating chamber into an upper and a lower portion. The two portions together, supplemented by the outside chamber or tube 28, hold the amount of water required for the charge of carbid which the hopper is designed to contain. In other words, there is a predetermined relation between the combined water-holding capacity of the upper and lower portions of the generating chamber and the outside chamber 28 and the carbid-holding capacity of the hopper 15. The lower portion of the generating chamber holds a much larger part of the water than the upper portion. The lower portion may hold say twice as much water as the upper portion, and the outside chamber 28 may hold as much or more water than the upper portion. The partition 26 has a central opening, through which the carbid dropped by the feed mechanism passes into the lower portion of the generating chamber. Generation commences as soon as the carbid strikes the water in the upper portion of the generating chamber and continues as it descends into the lower portion. The partition 26 preferably slopes in all directions to its central opening so that any carbid falling on the partition or any residuum formed thereon rolls or slides downward and passes through the opening into the lower portion. A gate 29, slidable in guides 30, affords means for closing the opening in the partition 26 and sealing off the upper portion of the generating chamber from the lower portion when the latter is to be emptied of its contents. This gate is open, however, throughout the operation of the generator, since the full body of water is necessary for generation.

It will be understood that any suitable or usual expedients may be resorted to in order to make the closure of the gate 29 as tight as possible. For this purpose the guides 30 and the portions of the gate sliding therein are made tapering, so that the gate is wedged up against the sealing surface around the opening in the partition. There is free communication between the bottom of the lower portion of the generating chamber and the outside chamber 28, such communication being conveniently afforded by an opening 31 in the side wall of the tank. The bottom 27 slopes downward to this opening from all directions, so that all the residuum may be cleared off the bottom and carried into the outside chamber. The said outside chamber is secured against the side of the tank and extends upward from the bottom thereof toward the top. The bottom of this chamber is closed and may if desired be somewhat lower than the lowest portion of the bottom 27. The cross-sectional area of this outside chamber may be varied, but it is preferably of small rather than of large size, and in fact it might be a tube of relatively small diameter. It preferably constitutes a housing for various parts presently to be described and it may be of any suitable size to accommodate them.

The gate is operated by a vertical rock-shaft 32 located in the outside chamber 28 and journaled in suitable brackets secured to the outer wall of the tank. At its upper end this shaft has a crank handle 33 and at its lower end carries a crank 34, which is connected with the gate 29 by means of a link or stem 35. In order to prevent pocketing of gas below the high portions of the partition 26, a by-pass 36 is provided. This by-pass is preferably disposed within the chamber 28 and at its lower end it taps the lower portion of the generating chamber just below the highest part of the partition 26 and at its upper end it delivers into the upper portion of the generating chamber above the water line. During the operation of the generator this by-pass is open, and any gas generated in the lower portion of the generating chamber and passing upward under the partition 26 escapes through it into the gas space of the generator. A vent pipe 37 extends from this by-pass through the outside chamber 28 and opens at its other end into the atmosphere at any suitable point. A three-way valve 38 controls the passage of gas or air through the by-pass and through the vent pipe, and this valve is automatically operated when the gate is operated by virtue of a crank 39 on the rock-shaft 32 engaging with a slotted arm 40 secured to the valve. The construction is such that when the gate is open, that is to say when the generator is running, the by-pass 36 is opened and the vent is closed. When, however, the gate is closed, communication through the by-pass from the lower to the upper portion of the generating chamber is cut off and the vent pipe is opened so that the top of the lower portion of the generating chamber is now in communication with the atmosphere. This prevents air passing from the lower portion of the generating chamber into the gas space in the generator when the said lower portion is emptied of its contents and when the lower portion is filled again with fresh water it prevents air being pocketed under the partition 26.

Means are provided for preventing feeding of the carbid during such time as the gate 29 is closed. This is important because the upper portion of the generating chamber holds only a fractional part of the requisite body of water, and were the feeding of the carbid continued, overheating and solidifying of the residuum would result. The motor 18 has a fly 41, which may be obstructed by a lever 42 so as to stop the motor and consequently the carbid feed. The said lever is urged by a spring 43 to move into the path of the fly, but is held out of obstructing position against the tension of the spring by reason of the tail of the lever engaging against the side of a post 44 rising from the filling plug 45 of the carbid chamber. This filling plug has screw-threaded engagement with an opening in the top of the cover 20 and constitutes the means for permitting the carbid hopper to be refilled. Whenever the filling plug is removed for this purpose the lever 42 automatically stops the motor, so that generation cannot continue while the generator is open. In order that the carbid feed may also be stopped when the gate 29 is closed, the rock-shaft 32 is connected with a sliding bar 46, which has a cam portion 47 beneath the tail of the lever 42. The construction is such that when the shaft is turned to close the gate the bar 46 is advanced so that the cam portion 47 rides beneath and raises the tail of the lever 42 clear of the top of the post 44, so that the spring 43 is free to move the lever into stopping relation to the fly 41. The lever 42 is made sufficiently flexible to enable it to be forced upward in this manner.

The residuum and liquid in the lower portion of the generating chamber and in the outside chamber 28 are removed upward above ground by a pump 48 of any suitable or usual construction, the tube 49 of this pump extending down to the bottom of the said outside chamber. The pump proper is located above the cover 25 and is preferably connected with the tube 29 by a separable joint 50 below the cover. Fresh water is admitted to take the place of the material removed, through a filling tube 51, which extends down the outside of the tank 10 and delivers at the high part of the bottom 27 opposite the opening 31. The top of this tube is provided with a suitable funnel or enlargement 52 to facilitate pouring. The water admitted through the tube and washed across the sloping bottom 27 effectually cleanses the latter of all adhering matter, which is carried into the outside chamber whence it is removed by the pump.

The gas produced in the generating chamber passes upward through the partition 11 by means of a pipe 53 and issues into the interior of the bell 22. The gas passes from the interior of the bell through pipes 54, 55, 56, constituting in effect a U-tube, from the bottom of which a drainage connection 57 extends down into a drainage chamber 58. The pipe 56 delivers into a filter chamber 70 containing suitable filtering material and thence the gas is delivered through a service pipe 59. Pipes 60, 61, 62 also constituting in effect a U-tube constitute a blow-off for relieving the generator of an excess of gas. The upper end of the pipe 60 rises above the water line in the bell and is encircled by a tubular cover 63, the lower end of which dips below the water line, thus effecting a water seal. The cover 63 is connected with the top of the bell so that when the latter rises above a predetermined height the lower end of the cover is lifted above the water, thus breaking the water seal and permitting gas to escape through the blow-off until the bell descends. The bottom of this blow-off is also connected with the drainage chamber 58 by means of a pipe 64. These drainage pipes 57 and 64 conduct any moisture that may be carried by the gas down into the drainage chamber. The latter is in communication with the outside chamber 28. For this purpose the drainage chamber is preferably located alongside said outside chamber, and an opening 65 is formed through the wall between them. The pipes 57, 64 are water-sealed at their lower ends, by virtue of dipping into the water in the drainage chamber.

Before generation is commenced the body of water for generation stands at the same height in the generating chamber, in the outside chamber 28 and in the drainage chamber 58. During operation when some pressure is inside the generator the level in the outside chamber 28 may be somewhat higher than in the generating chamber. In operation the carbid hopper is filled with carbid, the proper quantity of water is admitted to the generating chamber, the outside chamber 28 and the drainage chamber 58, the gate 29 is opened and the motor is started. Generation then proceeds in the usual manner. When the charge of carbid has become exhausted it is necessary to refill the hopper and also to remove the residuum, to clean the generating chamber and to refill it with water. First the handle 33 is manipulated so as to close the gate 29. This operation also stops the carbid feed and closes the by-pass 36 while opening the vent 37. The pump 48 is now operated to remove the residuum and liquid from the lower portion of the generating chamber and from the outside chamber 28. Water is poured into the filling tube 51 and flushes the sloping bottom 27. The flushing and the pumping are continued until such time as the lower portion of the generating chamber is thoroughly cleansed. Then water is filled into the lower portion of the generating chamber until the proper height is reached, as indicated by a float and float stem 66 suitably guided in brackets in the outside chamber 28. During the cleansing of the lower portion of the generating chamber dislodgment and removal of the residuum is assisted by an agitator which comprises a plate 71 mounted on a horizontal rock shaft 68. A crank arm on the latter is engaged by the lower end of a reciprocating rod 69 suitably guided in the chamber 28 and extending upward to a point where it can be conveniently operated. The gate 29 is now opened and this operation closes the vent 37 and opens the by-pass 36. The motor is started and generation proceeds as before.

What is claimed as new is:

1. An underground acetylene generator comprising the combination of a tank or casing having a water-holding generating chamber in its lower part, mechanism for feeding a charge of carbid to the water, said generating chamber comprising a lower portion holding a considerable part and an upper portion holding another part of the body of water appropriate to a charge of carbid, the two portions of the generating chamber being normally in communication, said lower portion having an exit opening at one side, an outside chamber into which said exit opening delivers, means for removing the contents of said lower portion from said outside chamber upward above ground, and means for sealing off the upper portion of the generating chamber from said lower portion when the latter is to be emptied.

2. An underground acetylene generator comprising the combination of a tank or casing having mechanism in its upper part for feeding a charge of carbid and a water-holding generating chamber in its lower part, said generating chamber having a lower portion holding a considerable part and an upper portion holding another part of the body of water appropriate to a charge of carbid, the two portions of the generating chamber being normally in communication and the bottom of the lower portion sloping to an exit opening, an outside chamber into which said exit opening delivers, means for removing the contents of the lower portion of the generating chamber from said outside chamber upward above ground, means for sealing off the upper portion of the generating chamber from said lower portion when the latter is to be emptied, an agitator in said lower portion, and filling means arranged to flush the sloping bottom thereof.

3. In an underground acetylene generator having suitable means for feeding the carbid to the water, a tank having a water-holding generating chamber in its lower part, said generating chamber comprising a lower portion adapted to hold a considerable part and an upper portion adapted to hold another part of the body of water appropriate to a charge of carbid, the two portions of the generating chamber being normally in communication and said lower portion having an exit, a chamber at the side of the tank into which said exit opens, said outside chamber being also adapted to hold a portion of the water, a pump entering said outside chamber for emptying the same and the lower portion of the tank, and means for sealing off the upper portion of the generating chamber from said lower portion when the latter is to be emptied.

4. In an underground acetylene generator, the combination of a tank or casing having a water-holding generating chamber in its lower part, mechanism for feeding carbid to the water, means partially dividing the generating chamber into upper and lower portions and having an opening normally permitting material to pass from the upper portion to the lower portion, means for closing said opening so as to cut the two portions of the generating chamber off from each other, an outside residuum-removal chamber in communication with the bottom of said lower portion and extending upward alongside and secured to the tank, and means for operating said gate from above ground extending downward in said outside chamber.

5. In an underground acetylene generator, the combination of a tank or casing having a water-holding generating chamber in its lower part, mechanism for feeding carbid to the water, said generating chamber comprising an upper portion and a lower portion connected by an opening normally permitting material to pass from the upper portion to the lower portion, a gate and operating means to close said opening so as to cut the portions of the generating chamber off from each other, a gas passage leading from the upper part of said lower portion and delivering into the upper part of said upper portion, and means whereby said passage is automatically closed when said gate is closed and opened when the gate is opened.

6. In an underground acetylene generator, the combination of a tank or casing having a water chamber in its lower part, mechanism for feeding carbid to the water, said generating chamber comprising an upper portion and a lower portion connected by an opening normally permitting material to pass from the upper portion to the lower portion, a gate and operating means to close said opening so as to cut said portions off from each other, an air vent communicating with the high part of said lower portion, and means whereby said vent is automatically opened when said gate is closed and vice-versa.

7. In an underground acetylene generator, the combination of a tank or casing having a water chamber in its lower part, mechanism for feeding carbid to the water, said generating chamber comprising an upper portion and a lower portion connected by an opening normally permitting material to pass from the upper portion to the lower portion, a gate and operating means to close said opening so as to cut said portions off from each other, a passage for leading off gas from the high part of the lower portion, an air vent communicating with the upper part of the lower portion, and means whereby said gas passage is automatically closed and said air vent automatically opened when said gate is closed and vice-versa.

8. In an underground acetylene generator, the combination of a tank or casing having a water chamber in its lower part, mechanism for feeding carbid to the water, said generating chamber comprising an upper portion and a lower portion connected by an opening normally permitting material to pass from the upper portion to the lower portion, a gate and operating means to close said opening so as to cut said portions off from each other, an air vent communicating with the high part of said lower portion, a gas duct also leading from the upper part of the lower portion, and a three-way valve controlling said vent and gas duct and connected with the gate operating means.

9. In an underground acetylene generator, the combination of a tank or casing having a water chamber in its lower part, mechanism for feeding carbide to the water, said generating chamber comprising an upper portion and a lower portion connected by an opening normally permitting material to pass from the upper portion to the lower portion, a gate and operating means to close said opening so as to cut said portions off from each other, and means for automatically stopping the carbid feed when said gate is closed.

10. In an underground acetylene generator, the combination of a tank or casing having a water chamber in its lower part, a carbid hopper with a filling plug in the upper part of the tank, motor driven feed mechanism, said generating chamber comprising an upper portion and a lower portion connected by an opening normally permitting material to pass from the upper portion to the lower portion, a gate and operating means to close said opening so as to cut said portions off from each other, means tending to stop the feed mechanism normally held against operation by said filling plug, and means whereby closing of said gate frees said stopping means from said filling plug.

In witness whereof we have signed our names in the presence of two subscribing witnesses.

AUGUSTINE DAVIS.
ALVA C. COLLINS.

Witnesses to the signature of Augustine Davis:
   J. F. BRANDENBURG,
   LOUELLA LITTLE.

Witnesses to the signature of Alva C. Collins:
   C. H. FIELDHOUSE,
   E. C. BICKEL.

Copies of this patent may be obtained for five cents each, by addressing the "Commissioner of Patents, Washington, D. C."